United States Patent
Maddox

(10) Patent No.: US 7,595,003 B2
(45) Date of Patent: Sep. 29, 2009

(54) ON-BOARD WATER TREATMENT AND MANAGEMENT PROCESS AND APPARATUS

(75) Inventor: Thomas L. Maddox, Chesterfield, MO (US)

(73) Assignee: Environmental Technologies, Inc., Ellisville, MO (US)

( * ) Notice: Subject to any disclaimer, the term of this patent is extended or adjusted under 35 U.S.C. 154(b) by 77 days.

(21) Appl. No.: 10/547,095

(22) PCT Filed: Jul. 16, 2004

(86) PCT No.: PCT/US2004/022799

§ 371 (c)(1),
(2), (4) Date: Jul. 11, 2006

(87) PCT Pub. No.: WO2005/076771

PCT Pub. Date: Aug. 25, 2005

(65) Prior Publication Data

US 2006/0273041 A1    Dec. 7, 2006

(51) Int. Cl.
- C02F 1/78 (2006.01)
- B06B 1/00 (2006.01)
- B01F 11/02 (2006.01)
- A61L 2/02 (2006.01)

(52) U.S. Cl. .............. 210/748; 210/760; 210/764; 210/192; 210/198.1; 210/205; 210/242.1; 366/113; 422/20; 422/128

(58) Field of Classification Search ................ 210/758, 210/748, 764, 931, 760, 319, 512.1, 192, 210/198.1, 200, 201, 202, 205, 206, 209, 210/242.1; 422/20, 128; 114/25; 366/114, 366/113
See application file for complete search history.

(56) References Cited

U.S. PATENT DOCUMENTS

| | | | | | |
|---|---|---|---|---|---|
| 662,330 | A | * | 11/1900 | Wilcox | 114/125 |
| 842,856 | A | * | 2/1907 | Calder | 114/125 |
| 4,076,617 | A | * | 2/1978 | Bybel et al. | 210/748 |
| 4,788,992 | A | * | 12/1988 | Swainbank et al. | 134/64 R |
| 5,040,487 | A | * | 8/1991 | Bollyky et al. | 119/234 |

(Continued)

FOREIGN PATENT DOCUMENTS

WO    WO 0001255 A1 *   1/2000

OTHER PUBLICATIONS

Bukhari, Z., et al., "Comparison of *Cryptosporidium parvum* Viability and Infectivity Assays following Ozone Treatment of Oocysts," *Appl. Environ. Microbiol.*, 66(7):2972-2980 (2000).
Chase, C., et al., "Marine Bioinvasions Fact Sheet: Ballast Water Treatment Options," MIT Sea Grant Center for Coastal Resources (2001).
Dahi, E., et al., "Steady State Disinfection of Water by Ozone and Sonozone," *Ozone: Sci. Engin.*, 2:13-23 (1980).

(Continued)

*Primary Examiner*—Matthew O Savage
*Assistant Examiner*—Lucas Stelling
(74) *Attorney, Agent, or Firm*—Mintz, Levin, Cohn, Ferris, Glovsky and Popeo, P.C.

(57) ABSTRACT

A contactor apparatus is provided to treat ballast water that has exited a ballast tank before being expelled from a waterborne ship. Within the contactor apparatus, means are provided for supplying a combination of acoustic energy and dissolved ozone. The acoustic energy can be provided at two or more frequencies (e.g., at 16 and 20 kHz). The acoustic energy and dissolved ozone, together, offer a more-effective and more-efficient mode of disinfecting the ballast water before release.

20 Claims, 4 Drawing Sheets

U.S. PATENT DOCUMENTS

| | | | | |
|---|---|---|---|---|
| 5,888,403 | A | * | 3/1999 | Hayashi ........................ 210/760 |
| 6,024,882 | A | * | 2/2000 | McNeilly et al. ............. 210/760 |
| 6,125,778 | A | | 10/2000 | Rodden ...................... 114/74 R |
| 6,171,508 | B1 | * | 1/2001 | Browning, Jr. .............. 210/750 |
| 6,402,965 | B1 | | 6/2002 | Sullivan et al. ............... 210/748 |
| 6,869,540 | B2 | | 3/2005 | Robinson et al. |

OTHER PUBLICATIONS

Donskoy, D., et al., "Low Frequency Sound as a Control Measure for Zebra Mussel Fouling," *Proceedings of the Fifth International Zebra Mussel and Other Aquatic Nuisance Organisms Conference*, Toronto, Canada, pp. 103-108 (Feb. 1995).

Dragsund, E., et al., "Ballast Water Treatment by Ozonation," *I*<sup>st</sup> *International Ballast Water Treatment R&D Symposium*, pp. 21-30 (2001).

Farrar, C.K., "Resonantsonic Advanced Oxidation Reactor", National Science Foundation Phase 1 Abstract #212, <http://www.nsf.gov.pubs/1999/nsf9981/phase1c.htm> (1999).

Oemcke, D., et al., "Chemical and Physical Characteristics of Ballast Water: Implications for Treatment Processes and Sampling Methods," CRC Reef Research Centre Technical Report No. 23 <http://www.reef.crc.org.au/publcations/techreport/TechRep23.html> (1998).

*U.S. Water News Online*, "Ultrasound Eliminates Crypto in British Tests" <http://www.uswaternews.com/archives/arcquality/6ultra.html> (Mar. 1996).

* cited by examiner

ON-BOARD WATER TREATMENT AND MANAGEMENT PROCESS AND APPARATUS

GOVERNMENT SUPPORT

The invention was supported, in whole or in part, by Grants No. NA96RG0478, No. NA03OAR4170008 and No. NA04ARA4170150, from the National Oceanic and Atmospheric Administration. The U.S. Government has certain rights in the invention.

BACKGROUND

It is estimated that as many as 3,000 alien species per day are transported throughout the world in the holds of ships. Most of these organisms do not survive the stress of the voyage and are not capable of competing in their new environments when they are discharged in a remote port. However, the records are replete with thousands of examples where alien species have thrived in their new environments and gone on to wreak ecological and economic havoc in their new surroundings. The most celebrated example of recent times is the zebra mussel (*Dreisenna polymorpha*) infestation of the Great Lakes and the Mississippi and Hudson Rivers. The infestation was established in the middle of the last decade and their numbers have exploded because of their efficient reproduction. The zebra mussels cling tenaciously to surfaces such as water and drain pipes and soon cause flow problems in water treatment plants and cooling towers. The infestations are expected to cost $5 billion in control efforts. Another rapidly spreading exotic specie in the Great Lakes ecosystem is the Eurasian ruffe, a foraging fish related to North American perch. Native fish populations are seriously affected by the feeding and reproduction capacity of the ruffe. Countless examples of alien or exotic species becoming established exist in other areas of the world, as well.

Regulation of ballast water management and treatment will be required to lessen the probability of alien species introduction and the concomitant economic and environmental impacts. The currently favored approach to mitigating the threat from ballast water is to exchange the water in the open ocean during transit. This practice can lower the density of larger organisms in the water from 170 to 2 per metric ton. Several shortcomings of the procedure exist, however. Safety of the ship is compromised when ballast is exchanged in open waters. Care must be exercised to avoid adversely affecting the performance of the ship in high seas and to avoid causing mechanical failure due to unsymmetrical loading of the ship. Thus, some ships are hesitant to adopt the practice. Even ships willing to comply with the practice can only manage to do so about 40% of the time. Also, a fraction of the ballast water is not pumpable and remains in the compartment along with sediments. Organisms may establish permanent or semi-permanent communities in this environment and serve as a reservoir of infestation to freshly loaded ballast. It is recognized that ballast exchange is neither practical nor effective as a means of treating ballast water, and that either land- or water-based treatment facilities are needed to effectively deal with the problem.

Most ships have a ballast water capacity that is 25 to 30 percent of their dead weight tonnage, with 25 percent being the norm. The volume of total ballast can range from 13,500 to 9.3 million gallons. An average ballasting rate is on the order of 300,000 gallons per hour, while an average deballasting rate is around 1 million gallons per hour for as long as 10 hours. Pumping and treating capacity of up to 10 million gallons per ship deballasting may ultimately be required of a treatment facility located dockside at the port. Dockside facilities would require space for constructing a treatment plant that could handle flows of that magnitude and the infrastructure and capacity to service all ships unloading in port.

On board treatment systems are increasingly considered to be a viable alternative. By taking on clean water, the transport of organisms is eliminated. Filtration of incoming ballast at the 251 μm size range has been determined to be an effective method of reducing the loading of zooplankton and phytoplankton in incoming ballast. Backflush water is simply discharged back into the harbor of origin. Secondary treatment options, such as ozone or UV, could be coupled with filtration for deactivation of smaller organisms. Treatment could also be carried out while the ship was under way, but the transit time may not be adequate. Shipboard treatment is hindered by the lack of space for installing the appropriate equipment, and sometimes by the lack of a suitable power source for pumping ballast water for treating. Treatment during deballasting may require a larger capacity system, and substances from the hold or ballast tanks, such as iron or sediment, can interfere with the treatment.

Ballast water presents unique challenges to conventional disinfection technologies owing to the large number of organisms, the diversity of their composition, and the chemical and physical characteristics of ballast water. Some characteristics of conventional technologies that have been applied to ballast water treatment are outlined, below.

Filtration:

Microfiltration removes most unwanted organisms; though, it may be too costly for large ships. The backflushing rate is excessive at 25 μm. 50 μm particle size removal is achievable, but 100 μm may be the practical limit. Microorganisms and dinoflagellates pass. Most likely, filtration is used in combination with UV or chemical biocides.

Thermal:

The water is heated to 60° C. for pasturization, which requires about 90 MW of energy on average ship. However, often only 20 MW is available. Moreover, thermal treatment generally is not practical in northern climates.

UV Irradiation:

Ultraviolet (UV) irradiation can be effective if water is not turbid. Only a short contact time is required, and the equipment can be had for a small capital expenditure. A portable unit may be immersed in ballast tanks for treatment during transit. There are no hazardous reagents used nor byproducts produced. UV irradiation requires filtration or cyclone pretreatment to maintain low turbidity. UV irradiation is not effective against higher organisms or cysts.

Chlorine:

Chlorine is effective at high doses and long contact times. However, chlorine is corrosive and hazardous to store and handle. Chlorine also produces chlorinated hydrocarbon byproducts. Though chlorine treatment is relatively inexpensive, the gas is potentially lethal.

Ozone:

Ozone can be effective at low doses and short contact times; ozone demand increases the necessary dosage. In previous methods, ozone was applied within the ballast tanks, where the effectiveness of ozone can be reduced by organic matter from sediment, and the effectiveness of the ozone was compromised in that ozone does not readily penetrate/diffuse through the sediment in the ballast, which is where many organisms reside. Bromine reactions and formation of halohydrocarbons were also a major concern. Further still, ozone treatment systems tend to be expensive, with a large initial capital investment. Ozone gas is also toxic; accordingly, monitoring equipment is employed while the system is operating. Ozone gas also has a corrosive effect on the ballast tank when employed in the tank. Nevertheless, ozone kills even highly resistant forms such as spores and cysts. Moreover, no hazardous reagent storage is needed, as ozone can be generated from dry air on demand.

Ozone is a mature technology, having been in use for over a century as a water and waste water treatment technology. The contact dosage needed to kill invertebrates in typical applications is on the order of 0.3 mg/L; and the most-resistant organisms, such as *Cryptosporidium* oocysts, can be killed via exposure to an ozone concentration of about 1.5 mg/L for 1 minute. Ozonation can be used to disinfect microorganisms, oxidize $Fe^{2+}$ and $Mn^{2+}$, control taste and odor, enhance coagulation-flocculation and remove color. An allotrope of oxygen, ozone is a highly reactive gas with a pungent odor having a standard oxidation-reduction potential of 2.08 volts. Because of this reactivity, the chemistry of the water will have an effect on the amount of ozone required for inactivation of organisms. Ozone readily attacks natural organic matter present in the water. At high pH (e.g., about 12), ozone may decompose to form the extremely reactive hydroxyl radical, which readily reacts with the carbonate or bicarbonate in waters. In ocean brines, ozone reacts with bromide to form brominated organic compounds, as well as bromate. Also, lower valent transition metals such as $Fe^{2+}$ and $Mn^{2+}$ will consume ozone.

Oemke and van Leeuwen (in "Chemical and Physical Characteristics of Ballast Water: Implications for Treatment Processes and Sampling Methods," *CRC Reef Research Centre, Technical Report No.* 23, 1998, and in "Potential of Ozone for Ballast Water Treatment," CRC Reef Research Centre, March 1998) have identified several potential problems when ozonating marine ballast waters, the most serious of which is reaction with bromide. The bromide concentration in seawater is 1.915 mg/L per % salinity. They estimated a significantly high bromide concentration of 40 mg/L in ballast water sampled during their work. The reaction chemistry of ozone with bromide is complex, and involves a cyclic decomposition reaction with bromide that simply consumes ozone and regenerates bromide. The reaction is mediated by the hypobromite ion. This anion undergoes an additional reaction with ozone to form bromate. In this reaction, one mole of hypobromite consumes two moles of ozone. Hypobromous acid is a weak acid with a pKa of 8.8 at 20° C. The conjugate acid of hypobromite does not further react with ozone, so the authors suggest that lowering the pH to about 7 would assist in quenching the cyclic decomposition and the formation of bromate. The bromide reaction is further complicated in the presence of dissolved organic matter. The reaction paths become so complex that empirical models are required to predict the amount of bromate that forms. Organobromine compounds form, as well, a concern from a health and environmental standpoint.

The concept of shipboard treatment of ballast water presents a number of challenges that any technological solution would typically need to address. These challenges include a variety of constraints and performance expectations. First, large volumes (up to 10 million gallons), which are routinely taken on and discharged as part of the normal ballast operation of the ship, must be treated at a rate high enough to keep up with the ship schedule. Second, both macroscopic organisms and microorganisms and their spore and cyst forms must be killed or inactivated. Third, the quality of ballast water typically is poor, with high turbidity and a difficult chemical matrix. Fourth, both space and power are limited aboard a typical ship.

SUMMARY

The National Research Council's Committee on Ships' Ballast Operations has negatively rated ozone for the reasons cited above, as well as for the maintenance requirements of the generators and corrosion problems induced by the ozone. One can limit the side reactions of ozone by reducing the amount of ozone dosing and increasing the contact time. At least part of the killing power of ozone resides in merely contacting the organisms with ozone bubbles. In a limited space environment, such as the pump or engine room of a ship, it may not be possible with previous technology to provide the time-space capacity necessary to significantly lower the ozone dose and improve its effectiveness as a biocide. In accordance with the methods described below, an acoustic mixer (such as those available from Advanced Sonics, Oxford, Conn.) used in combination with an ozone generator can provide improved contacting and intense acoustic fields.

Despite the complexities and myriad chemical reactions that ozone can undergo, it remains a powerful and practical treatment strategy. One can monitor retention time and residual ozone concentration to determine if the system is functioning correctly. Thus control algorithms can use input data from a flow meter and an ozone concentration monitor at the discharge of a contact chamber to insure that the treatment is adequate. This ease of monitoring is a distinct advantage over other treatment options, such as UV. Even slight decreases in radiation intensities can affect the killing efficiency. If organisms are not fully killed, they may repair their DNA with dark repair enzymes and recover. Further, there may be concern about radiation-induced mutations in surviving organisms.

The water treatment apparatus described herein can be implemented on a water-borne ship. The apparatus is coupled with a conduit for delivering water from the sea to the ballast tanks or, more preferably, with a conduit for delivering ballast water from the ballast tanks back to the sea in the barge or ship. Accordingly, the water is treated outside the ballast tanks, before the water enters or after it leaves a ballast tank. The apparatus combines the following three systems in its treatment of the water: a sonic reactor for delivering sonic waves through the water, a regulated ozone source for delivering ozone into the water, and a filter for filtering the water before it is subjected to the dissolved ozone treatment. The apparatus can disinfect water flowing through the conduit into or out of the ballasts of a ship at a continuous flow rate of 150 gallons or more per minute.

Ozone can be an effective killing technology against undesirable organisms transported in ballast water if it is coupled with a sonic reactor that radiates high-intensity energy and filtration. This form of energy enables mass transport and micromixing that cause improved ozone utilization. Filtration, which can be provided via a filter positioned upstream from the ozone source and sonic reactor, reduces the amount of material to be treated. A premise of methods and apparatus described herein is that contacting the organisms in the ballast water with the ozone in a sonic reactor can significantly lower the dose of ozone required to kill organisms. The lowered ozone requirement can result in less byproduct formation and improved economics.

The acoustic mixer uses a mechanically driven acoustic transducer promote intimate mixing of gases, liquids, and solids for chemical processing. Two or more resonating members or piezoelectric or magnetostrictive transducers operating at different frequencies (e.g., at 16 and 20 kHz) can be employed in the mixer to generate the acoustic vibrations. The same fluid dynamic mechanisms responsible for the enhanced contact in chemical systems will improve the contact between the organisms in ballast water and the ozone bubbles, resulting in greater mortality at small dosing rates. The high intensity acoustic pressure wave that is propagated in the reactor will stress and traumatize the organisms, increasing their vulnerability to the ozone.

Advantages of the apparatus and method include the following: (a) the apparatus can be compact (i.e., having a small footprint that can fit within available space aboard a ship); (b) the apparatus and methods can be effective in inactivating organisms with a short contact/exposure time; (c) there is no need for storage or handling of toxic chemicals; (d) there are no residual concentrations of environmentally harmful substances; (e) the methods and apparatus allow ballast water, to be treated as part of normal ballasting or deballasting operations at a flow rate that is compatible with the operational schedule of the ship; and (f) the treatment can be performed outside the ballast tanks, where the sediment in the tanks will not compromise the disinfection. Further, the apparatus and methods are economically attractive.

DETAILED DESCRIPTION

Figure 1:
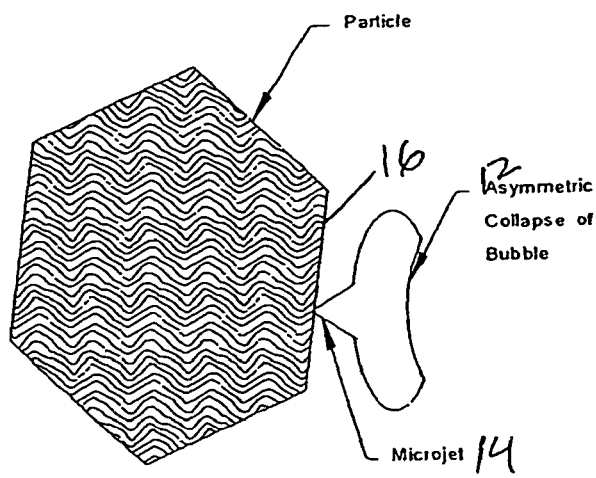
FIG. 1 schematically illustrates an asymmetric collapse of a cavitation bubble.

The technology is based on generating acoustic vibrations in process fluids to perform useful work such as mixing and interphasal mass transport. The acoustic frequency can be low or high, though frequencies in the audible range can produce excessive noise and resultant discomfort for those on board the ship. Frequencies at the lower end of the ultrasonic range (e.g., between 16 and 20 kHz) can be highly effective; and the use of dual frequencies (the simultaneous application of two frequencies) can further improve effectiveness. When the resultant vibrations agitate a fluid under conditions such that the fluid can absorb the vibrational energy, phenomena occur that enhance mixing and mass transport.

Description of Sonic Technology:

Approach:

The fundamental processes that the sonic technology of all frequency regimes exploit are cavitation and acoustic streaming.

Cavitation:

Tensile forces can be imposed in a liquid via the transmission of acoustic rarefaction waves, which can overexpand the liquid. If the liquid is sufficiently expanded by these tensile forces, vapor cavities are formed. The formation of these cavities is the onset of cavitation. Cavitation in liquids is the nucleation, growth and subsequent collapse of bubbles. During collapse, high pressures, high temperatures and large shear forces can result. Their magnitude is a function of intensity and nature of the driving force (frequency and power) that are imposed in the fluid. The magnitude of these effects is a function of the liquid viscosity, liquid surface tension, liquid temperature, vapor pressure, particulate content and dissolved or entrained gases.

The use of cavitation in chemical processing is referred to as sonochemistry. Typically, frequencies in what is known as the power band of ultrasound ranging from 20 kHz to 900 kHz are employed in existing sonochemistry applications. Temperatures of 5,000° C. and pressures of several hundred atmospheres have been measured in bubbles formed during cavitation. Although these conditions exist for only microseconds, the temperatures and pressures, coupled with the mixing that occurs in the cavitating media, are extremely effective in accelerating chemical reactions far beyond rates that are feasible via normal processing systems. Moreover, during the cavitation-induced asymmetric collapse of these energetic bubbles 12, liquid micro-jets 14 are generated, which impinge on surfaces 16 with great force, as illustrated in FIG. 1. These high-velocity jets 14 produce extraordinarily large local shear forces. The conditions created by cavitation are extremely inhospitable for organisms.

Acoustic Streaming:

Acoustic streaming is a time-independent circulation of fluid induced by a sonic field. Acoustic streaming is caused by momentum dissipation in the fluid by the absorption and propagation of sound. This transfer of acoustic radiation is proportional to the acoustic intensity and can be quite profound in violently disturbing the fluid. Acoustic streaming has been demonstrated to be responsible for enhanced heat transfer rates, improved mass transfer, changes in reaction rates, emulsification and depolymerization.

The phenomenon is of particular interest in this application of the technology because of its ability to cause large velocity gradients and shearing stresses, both of which accelerate and promote particle collisions, thereby virtually eliminating concentration gradients, and thus accelerating and enhancing mass transport processes. Small organisms and cysts disaggregate from other suspended particles. Some degree of physical damage or destruction results from the greatly aggravated hydraulic action, and the mass transport of ozone to the cyst surfaces is enhanced.

The combined effects of the cavitation bubbles (high pressures and temperatures), jetting of fluids, strong-acoustic streaming and the fluctuating, high-energy acoustic sound field induced into the fluid by the acoustic mixing process that permeates the liquid, virtually provides an "acoustic minefield," which will cause stress, degradation and, very likely, destruction of organisms. At a minimum, this acoustically driven hydraulic activity will greatly assist the effectiveness of ozone in killing organisms in ballast water.

Sonic Frequencies:

Acoustic energy applications in the field of sonochemistry have generally been conducted, e.g., at 20 kHz and higher. Even though the use of high-frequency acoustics to accelerate chemical reactions is well established, they have generally only been demonstrated in bench scale experiments. Consequently, the use of ultrasonics has not been integrated into many industrial chemical processes. The fundamental limitation for large-scale ultrasonics applications is illustrated in Equation 1, which is derived from first principles. This clearly shows that the attenuation of sonic energy, a, in liquid media is proportional to the square of the frequency, f.

$$a = \frac{2\pi^2 f^2}{\rho c^3}\left(\frac{4}{3}n_s + n_B + \frac{(\gamma-1)K}{C_P}\right), \quad (1)$$

where $\rho$ is density, c is the speed of sound, $n_s$ is shear viscosity, $n_B$ is bulk viscosity, $\gamma$ is the specific heat ratio, $C_p$ is the specific heat, and K is the thermal conductivity of the medium.

Using Equation 1, it can be shown that large amounts of energy are required to generate cavitation phenomena to propagate distances of practical interest into media for industrial scale systems at higher ultrasonic frequencies, e.g., generally 20 kHz to 500 kHz. These factors have precluded the application of sonochemical devices for industrial processing applications. Because of the potential for significant improvements in process enhancement achievable by cavitation, attempts are underway to circumvent the scaling issues by various techniques. However, practical means to scale up ultrasonic driven systems have not been established, nor is a commercial process for doing so apparent.

Higher-intensity cavitation generates higher temperatures, pressures and shear forces; these are the mechanisms responsible for the sonochemical and mechanical acceleration of kinetic processes in liquids and slurries. As shown in Equation 2, one can establish a relation between intensity, I, of acoustic energy in media, physical properties (density, $\rho$, and velocity of sound, c), frequency of vibration, $f$, and vibrational amplitude, A.

$$I = \frac{1}{2}\rho c f^2 A^2. \quad (2)$$

From Equation 2, it can be seen that the acoustic intensity can be enhanced either by increasing the frequency or by increasing the amplitude of the driving force.

Acoustic-Mixing Process and Machine:

"Acoustic mixer" is a term used to describe a broad-based machine that causes acoustic oscillations. As previously noted, such a mixer can be obtained from Advanced Sonics. The acoustic mixer has been demonstrated to generate strong-cavitation in liquids and slurries. The principle of operation utilizes the transmission of the sonic energy into fluid media to cause a "catalytic-like" effect to accelerate or enhance chemical reactions and other processes.

Figure 2:
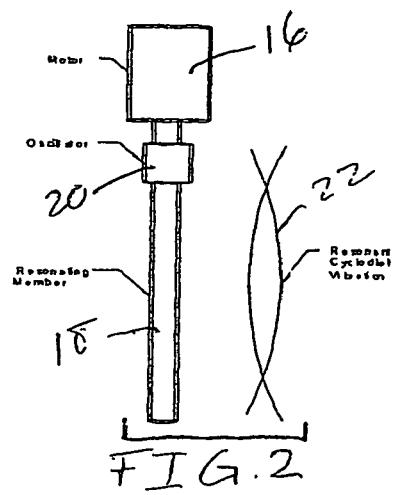
FIG. 2 is a schematic representation of the principle of operation of the acoustic mixer.

FIG. 2 is a schematic depicting the underlying principle of operations for an embodiment of an acoustic-mixing machine. The mechanical energy from an electrical or hydraulic motor 16 is used to rotate an eccentric drive assembly that is coupled to a mechanical member 18, e.g., one or more bars or plates. The most common members 18 are a specially treated solid steel bar and a hollow tube resonator (HTR). The rotational frequency of the oscillator 20 is adjusted to bring this mechanical member 18 into resonance. The concept of resonance is important to stress here, because, like its electrical circuit analog, a tuned mechanical resonant oscillator 20 is capable of delivering orders of magnitude more vibrational energy 22 to the load when operated at its fundamental resonant frequency or one of its harmonic overtones. When this resonant member 18 is vibrated in a liquid or slurry media, cavitation results from the intensity of the energy transmitted.

Figure 3:
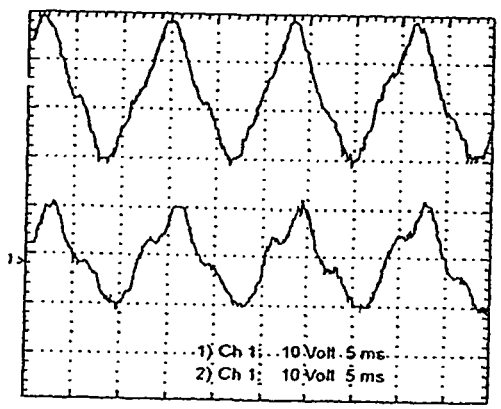
FIG. 3 is a chart showing the oscilloscope traces of hydrophone signals in a sonic reactor; the intensities correspond to 215 dB in the top signal and 209 dB in the bottom signal.

In this embodiment, the fundamental frequency of the resonant bars is nominally 75 Hz, as seen in FIG. 3, which is an oscilloscope trace of the signal from a hydrophone immersed in water while the sonic bar is vibrated. Conditions in the reactor were changed to produce the more intense wave at the top. The hydrophone is a calibrated transducer for measuring the intensity of acoustic waves. The intensity of the top signal corresponds to a 215 dB re 1 µPa sound pressure level.

The phenomena associated with the acoustic field would also make the contactor suitable as a UV reactor by inducing turbulence at the lamp surface, keeping the lenses clean and providing a high throughput of organisms. The test reactor used for batch tests is fabricated from 316 stainless steel and can be configured for batch processing of 10 to 35 L quantities, or as a flow-through reactor. One embodiment of a continuous contactor is substantially in the form of a cylinder having a diameter of about 0.6 m and a height of about 2.4 m and can be incorporated in the shipboard skid. The axis of the cylinder can be oriented vertically or horizontally on board the ship.

Observations made during the reactor operation in the Montec laboratory clearly indicate that the technology promotes very energetic and turbulent solid/liquid and solid/gaseous mixing, sufficient to enhance gas solvation and mixing. The sonics process produces acoustic streaming in a fluid by adsorption of sound in the fluid and collapsing bubbles.

Dynamics of Ozone Solubility in an Acoustic Pressure Field:

In one embodiment, a bubble of ozone-enriched oxygen exposed to an acoustic pressure field experiences a contraction due to the pressure part of the wave lasting 666 msecs. At an intensity of 215 dBA, the RMS average pressure during this period is 0.8 atmospheres.

The bubble dynamics cause two effects:

The boundary layer around the bubbles is in shear due to the rapid expansion and contraction, thus gradients do not become steep; and The increased pressure of gas in the bubble on the contraction side increases the solubility of the ozone for about 6 msec per vibration cycle.

The solubility of ozone in a liquid is given by Henry's Law as:

$$P_{O_3} = H[O_3]_{sat} \quad (3)$$

where $P_{O3}$ is the partial pressure of ozone in the bubble, H is Henry's Law constant for ozone (which is a function of temperature), pH, and ionic strength of dissolved solutes in water. Inside the gas bubble the total gas pressure $P_g$ is:

$$P_g = P_h + P_a \quad (4),$$

where $P_h$ is the hydrostatic pressure, and $P_a$ is the acoustic pressure. The gas inside the bubble is composed of oxygen and ozone:

$$P_g = P_{O2} + P_{O3} \quad (5).$$

The partial pressure of ozone in the bubble would be given by:

$$P_{O3} = X_{O3} P_g \quad (6),$$

where $X_{O3}$ is the mole fraction of ozone in the bubble. For a gas stream that is 2% by weight ozone, the mole fraction is about 0.014.

Figure 4:
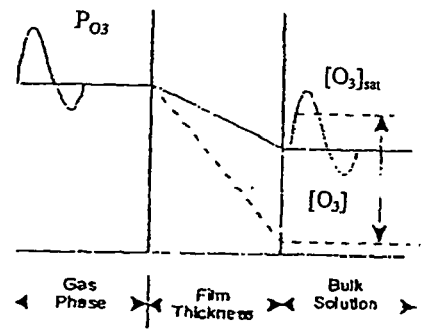
FIG. 4 is a chart illustrating the gas-liquid relationships for ozone in an acoustic pressure field.

The rate of ozone mass transfer into the liquid phase is given as:

$$D[O_3]/dt = k_L a ([O_3]_{sat} - [O_3]) \quad (7),$$

where $[O_3]$ is the bulk solution concentration of ozone at any time and $[O_3]_{sat}$ is the saturation concentration for ozone given by Equation 3. $k_L$ is the liquid mass transfer coefficient of the gas and "a" is the specific gas liquid interfacial area. In the liquid film surrounding the bubble, ozone will start to diffuse across the interface. The process can be visualized for purely physical absorption as in FIG. 4 (where spatial coordinates are represented on the horizontal axis, and pressure is represented on the vertical axis). As shown in FIG. 4, ozone in the gas phase with partial pressure, $P_{O3}$, diffuses across a film of liquid at the gas liquid interface, and the aqueous ozone concentration $[O_3]$ rises until $[O_3]_{sat}$, the equilibrium concentration for the partial pressure and temperature, is reached. The driving force for the dissolution of ozone is the "ozone deficiency," i.e., the width of the gap between $[O_3]_{sat}$, and $[O_3]$. The ozone deficit is indicated by the two arrows. Implicit in the representation is the fact that an increase in $P_{O3}$ will result in a higher $[O_3]_{sat}$ and an increase in the width of the gap.

When the rarefaction part of the wave acts on the bubble, $P_{O_3}$ will decrease as the volume of the bubble increases. The aqueous concentration of ozone will now be out of equilibrium with the lower partial pressure of ozone in the bubble and start to diffuse back into the bubble. If the acoustic pressure variation were symmetric about the relative pressure=0 axis, and if the rates of ozone diffusion in both directions were the same, one would expect that no net gain in ozone solubility would be obtained under sonication.

Figure 5:
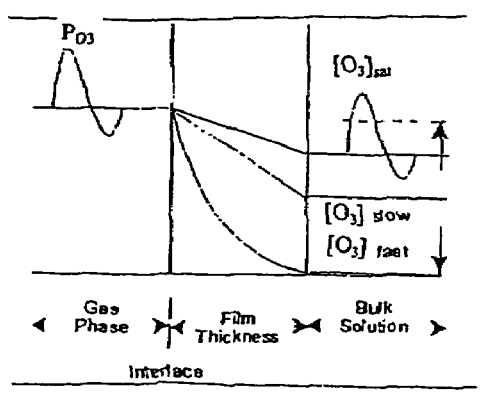
FIG. 5 is a chart illustrating the gas-liquid relationships for ozone in an acoustic pressure field with coupled reaction in solution.

Ozone absorption coupled with chemical reaction results in a different concentration profile. FIG. 5 is a plot of ozone concentration profile when either a fast or slow chemical reaction consumes the ozone in the liquid. If conditions in solution are such that direct reaction of ozone with some substrate or decomposition of ozone to form hydroxyl radicals is occurring, the concentration of ozone can range from zero to some value less than $[O_3]_{sat}$, depending on the rate of the reaction. This is in spite of the fact that ozone is being transferred from the gas to the liquid phase. The persistent width of the deficiency gap gives rise to a "chemically enhanced" rate of uptake of ozone.

This maintenance of an ozone deficit through the presence of an oxidizable substrate contributes to the mass transfer efficiency. Because of its ability to "pump" ozone into a liquid, the rate of mass transfer is greatly enhanced when the concentration of ozone hovers near zero in solution because of its rapid consumption by an oxidizable substrate or its decomposition to hydroxyl radical. Some or all of the ozone pumped in during the compression wave is consumed by chemical reaction before the rarefaction part of the wave lowers the partial pressure of ozone in the bubble, resulting in a lower solubility of ozone.

Coupling of Ozone Disinfection with Sonic Energy for On-Board Ballast Water Treatment:

Benefits of incorporating an acoustic mixer (also referred to herein as a "contactor" or "reactor") in an onboard ballast water treatment technology include:

Promotion of better contact of ozone with target organisms, thus reducing the physical "time-space" requirement and permitting its use aboard ships;

Traumatization of organisms through the imposition of a strong (215 dB re 1 µPa) acoustic field which may synergistically contribute to the inactivation of the organism; and Reduction of the amount of ozone, which must be used to effect inactivation, thus minimizing the negative influence of bromide in marine waters and improving the economics.

One mechanism that results in higher disinfectant dosage requirements is the association of viable particles with suspended matter in the water. Sonic disruption of these aggregates would enhance the contact of ozone with the target organisms. Also, organisms in a weakened physical state are more susceptible to inactivation. It is known that *Cryptosporidium* oocysts shaken with sand and then exposed to chlorine for 5 minutes experience a significant decrease of vitality. Normally, over 90 minutes of contact time are required at 80 µg/L chlorine dosage to achieve the same level of disinfection. Administration of ultrasound and ozone together produces an enhanced rate of *Giardia* cyst destruction, presumably through cyst damage and enhanced mass transport of ozone into solution.

Ultrasonic energy has routinely been used in laboratories to disrupt cells. Typically, a frequency of 20 kHz and an energy intensity of 10 W/cm² are required for cell rupture when sonication is used alone. Technology based on ultrasound alone as a disinfection mechanism has recently been proposed for *Cryptosporidium* in drinking water. Economic and technological limitations have stymied the advance of ultrasound technology into the realm of industrial scale processes. Ultrasonic transducers are either piezoelectric or magnetostrictive devices.

There is mounting evidence that stressors, such as abrasions or physical damage incurred during disinfection, augment the disinfection process. The combination of technologies proposed here utilizes the disinfection power of ozone coupled with an acoustic transducer. This device has been demonstrated to increase the mass transport rate of ozone into solution and promote energetic inter-particle collisions that lead to particle size reduction.

Low-frequency acoustic energy has been evaluated as a control measure for zebra mussels. An intensity of 195 dB re 1 µPa (corresponding to 4 kPa) at frequencies from 36 Hz to 1 kHz had no effect on the vitality of juvenile and adult colonies of the zebra mussels. Parallel studies with non-target species, which included algae (*Anabena, Gomphosphaeria, Microcystis*, and *Apharnisornenon*) and zooplankton (*Daphnia* and *Leptodiapiomas*), indicated that these species were not adversely affected by sound intensity of that magnitude.

The intensity of sound in the acoustic mixer (e.g., an Advanced Sonics™ acoustic mixer) is 215 dB re 1 µPa (corresponding to 50 kPa), over an order of magnitude greater pressure. The organisms are subjected to the sound pressure and hydrodynamic shear forces, the magnitude of which can be enhanced by the design of the contactor. Simultaneously, ozone bubbles introduced into the contactor are shattered into smaller bubbles by the acoustic field and energetically transported in complex trajectories by acoustic streaming. The nature of the hydrodynamic flow regimes induced by the agitation is a non-linear mixture of effects caused by cavitation and acoustic streaming. Both "microscale turbulence" and a larger-scale circulating bulk flow pattern are discernable. The large-scale flow regime is in part the result of the "mutational" vibrational mode of the transducer imparting momentum to the fluid in the manner of a rotating cylinder. This larger scale regime is broken up in the contactor by acoustic focusing projections, which behave as baffles at that scale. Thus, the energy dissipation into the fluid is intense. In effect, one is substituting mechanical energy for some of the chemical energy necessary to inactivate the organisms.

To provide adequate contact residuals for inactivation, ozone must be supplied at a rate greater than the matrix ozone demand consumption rate. To some degree, this effect can be offset by the nature of the ozone contacting system because part of the mechanism of ozone disinfection appears to be related to the actual contact of an ozone-containing gas bubble with the organism rather than to the concentration of dissolved ozone. A large part of the improvement over the traditional ozone technology offered in this proposal is in the degree of contact of ozone bubbles with organisms suspended in the water.

Figure 6:
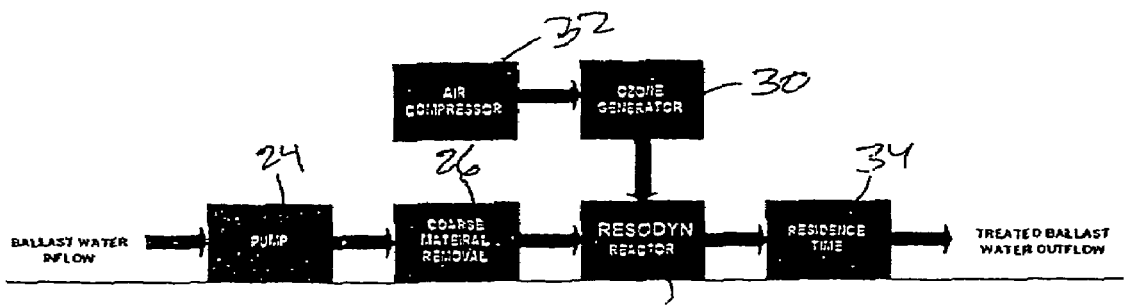
FIG. 6 is a process diagram of the sonic-ozone treatment.

The Acoustic Process for Onboard Ballast Water Treatment:

The development of an ozone-based treatment system for ballast water around the energetic contacting ability of the sonic reactor compresses the "time-space" requirement for ozone deactivation into a volume compatible with the current shipping design and also lowers the amount of ozone required to inactivate organisms. If the treatment is conducted during ballasting, about 5000 gallons per minute may be treated, providing an equivalent ozone contact time of several mg/L residual ozone for several minutes. This is typically enough to deactivate the cysts and spores of plankton and microorganisms even in conventional circumstances. A block diagram of the process is shown in FIG. 6. During ballasting, water is pumped (step 24) through a filter or cyclone that removes (step 26) particles larger than about 100 μm. The filtered water enters (step 28) an Advanced Sonics™ contactor along with a 4% ozone stream fed (step 30) by an air compressor 32 supplying −60° C. dewpoint air. An additional block indicates residence time (step 34), which may be a passive residence time in a pipe or an active residence time in another sonic contactor. Two contactors in series with the treatment water and the ozone flowing counter current is one configuration.

The concentration of ozone provided is that which is necessary for lethally contacting a wide spectrum of organisms; that concentration can readily be determined for various water samples from field testing the module; the system controls can be programmed to deliver the correct dose of ozone, even in the face of changing demand. Response of the system to changing ozone demand can be accomplished by adjusting the incoming flow of water (e.g., reducing the rate at which the water is flushed from the ballast through the contactor) or changing the output of the ozone generator (e.g., generating more ozone).

Figure 7:
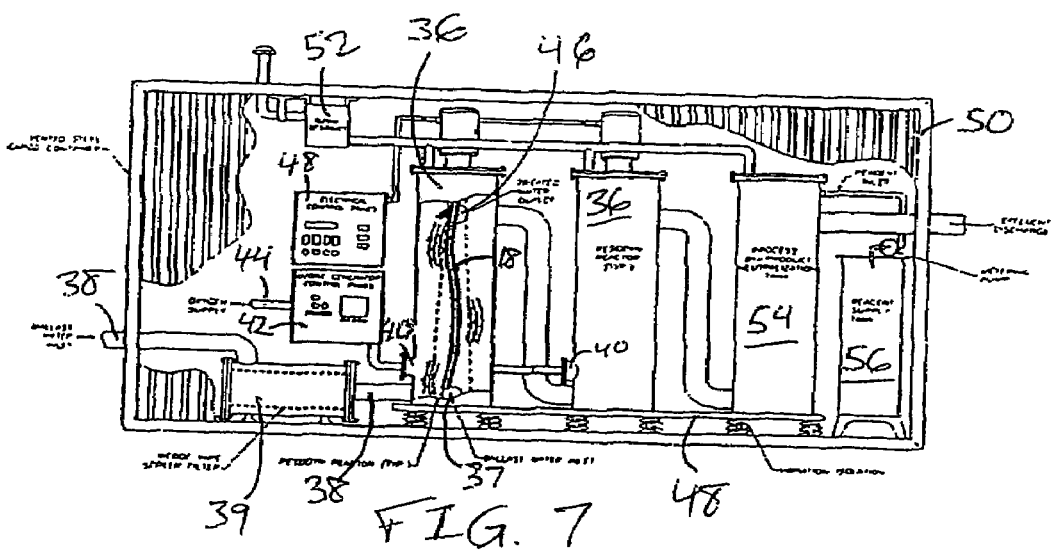
FIG. 7 is an illustration of a ballast water treatment system configured in a standard 8-foot-by-8-foot shipping container.

The physical configuration of the test module is similar to the diagram in FIG. 7. The unit is skid mounted in a vented acoustic enclosure and vibration-isolated from its environment. A plurality of Advanced Sonics™ contactors 36, each 2 feet (0.6 m) in diameter and 8 feet (2.4 m) in height, are housed in the enclosure, allowing four in operation and two in reserve. Ballast water is distributively fed into a ballast water inlet 37 in each of the contactors 36 via an inlet pipe 38, though the ballast water first passes through a screen filter 39 to filter out larger organisms and other objects from the ballast water stream. Ozone is also fed through ozone inlets 40 into the contactors 36, the ozone being supplied from an ozone generator 42, which in turn is fed dried, compressed air through pipe 44. Ballast water exits the contactors 36 through a ballast water outlet 46. The ballast water can then be passed through a process-byproduct neutralization tank 54, which is coupled with a reactant supply tank 56. In an operating system, the reactant supply tank can be replaced with a system for measuring bromide and bromate concentrations and for reducing ozone supply if those concentrations are too high. The resonating member 18 in each contactor 36 is controlled by an electronic computer controller 48, which sends commands to the ozone generator 42 to control sonication in the contactors 36. The ozone generator 42 can also be provided with a computerized controller. The contactors 36 are mounted on a spring-loaded platform 48 to isolate the contactors 36 so as to minimize transfer of vibrations therefrom to the rest of the ship.

The ozone dose required to kill organisms can be lowered by the efficiency of the acoustic contactor. The generator is water-cooled. Additional contact time, if necessary, can be provided downstream in a pipe reactor. Dosing and safety operation can be controlled by a logic controller using fuzzy logic. Safety is a primary criterion in design, especially since the device will be operated in a confined space. The entire unit is housed in an 8-foot-by-8-foot shipping container 50, which can be designed to provide acoustic isolation, and which is actively vented outside. Process off gas is vented through an ozone destruct unit 52, and ozone concentration monitors are placed around the unit and interfaced to interrupts, which can shut down the system.

Ozone concentration and sonic intensity are major variables. Temperature can be held constant at 15° C. The ozone concentration in the water can range from 0.25 to 5.0 mg/L, and the sonic intensity can range from 205 to 215 dB re 1 μPa. Ozone concentrations are levels that are maintained during the contact period. pH is an additional variable, and it can affect the bromite/hypobromite chemistry issue.

Reducing Aquatic Invasion Species:

Filtering is used to remove organisms and organic matter that needlessly consume disinfectant (ozone, hydrogen peroxide, biocides, etc.), or interferes in the disinfection processes, such as causing turbidity that shadows organisms from UV radiation. Finer filtering results in higher-efficiency disinfection processes. However, as the filtering becomes finer, so do the system operational problems. Finer filter meshes are quickly blinded by organisms, organic materials and inorganic materials, such as sand or silt. Hydraulic backflushing of the permeate flux is required to clear the filters, which increases the pumping system pressure requirements and increases the pumping horsepower and flow rates needed to meet the high flux rates needed to meet practical ballast water flow requirements. The tradeoff in system cost is driven by the relationship between fine filtration and the effectiveness of the disinfectant demand needed to deactivate organisms that are not filtered out, but reside in the permeate. One embodiment employs filtration down to 180 microns utilizing a self-cleaning wedgewire strainer to condition the ballast water prior to treatment with ozone.

A commonly used indicator life form for disinfection testing is *Bacillus subtilis* because of its resistant endospore. Endospores of this bacterium can be used to assess the efficacy of ozone dosing. *B. subtilis* var. *niger* endospores ATCC 9372 are employed as sterilization indicators for hospitals, food processing, etc. These endospores are commercially available from SGM Biotech, Inc., in Bozeman, Mont. in any desired concentration. Vials were obtained with $6.9 \times 10^7$ CFU/0.1 mL in alcohol. When the entire contents of a vial were transferred to a 35 L volume, a starting concentration of $1.7 \times 10^5$ CFU/mL ($5.24 \forall 0.5$ log) was obtained.

EXPERIMENTAL

Experiments were conducted as batch challenges. Over the course of the ozone exposure, samples were collected into sterile polyethylene bottles. Some samples were immediately quenched in sodium thiosulfate to stop any lingering disinfection reactions. It was first verified that the sodium thiosulfate did not reduce spore viability by itself.

In the samples, the remaining spore viability was determined by culturing dilutions of the original samples on tryptic soy agar and counting the colonies that formed. Microscopic examination of some of the samples using fluorescence staining techniques that could differentiate between live and deactivated spores was used to confirm the results of the plate counting techniques. The microscopic examination used LIVE/DEAD BacLight Viability stains coupled with Fluorescence Microscopy (Molecular Probes, Inc., Eugene Oreg.). These analyses were conducted by Dr. Grant Mitman of the Biology Department Montana Tech of the University of Montana.

The overall campaign included the following stages:

Characterization of the ozone concentration time ("ozone concentration time" is the integral of ozone concentration over time) behavior of the surrogate in a simple chemical matrix, i.e., deionized water at a buffered pH;

Characterization of the ozone concentration time behavior of the surrogate in a synthetic sea water matrix;

Using the surrogate to estimate the required ozone dose in an actual ballast water; and Verification of disinfection of actual ballast water.

A 316 stainless-steel reactor with a capacity of 35 liters was used to conduct all of the experiments. A conical tank was used to prepare each batch for testing by the addition of buffer and spores. When synthetic seawater was used, it was mixed in a 750-liter reservoir and delivered to the 35-liter batch tank for the addition of endospores. The batch was then pumped to the reactor. Ozone for the system was generated by an Ozonia Model CFS-1A corona discharge system, which was fed on oxygen. The output of the generator was controlled by a Love Controls Series 2600 PID controller, which received a 4-20 mA output from an ATI dissolved ozone sensor. Because of the acoustic waves inside the contactor, the ozone sensor was mounted in an outside recirculation loop where it was isolated from the pressure fluctuations. The sensor was calibrated in the exact configuration it occupied during the testing. The sensor operates in two ranges: 0-20 ppm or 0-2 ppm ozone, and both of these were calibrated independently. Ozone produced by the generator was fed into the contactor through a pair of alundum diffusers located at the bottom of the reactor. Ozone escaping the vessel was vented through an ozone destruct unit prior to venting outside. Acoustic radiation by the sonic member located in the center of the contactor was measured by a hydrophone. A solenoid-operated sampling valve allowed samples of the spore suspension to be collected over time.

A record of each experiment was collected by capturing the output of the sensors to a data acquisition system run under HPVee software.

The signals captured were:

Ozone concentration;

Temperature;

Power output of ozone generator;

Solenoid valve activation during sampling event; and

Elapsed time.

The acoustic signals were captured on a Tektronix TDS 210 oscilloscope. The acoustic energy was produced by a 2-inch diameter 4130 steel bar sheathed in a CPVC protective cover, driven by a sonic oscillator. The system was brought into resonance by adjusting the rotational speed of the drive motor with a variable-frequency controller.

The pH was measured before and after the challenge with an Orion 7 3000 pH meter. Both the buffer and spores were added to the 35-liter batch and the tank was agitated for 5 minutes after each addition. The batch was then transferred to the test reactor for the challenge. Depending on the type of experiment, sterilized bottles with or without thiosulfate quench solution already present were used to collect samples. The procedure for beginning each experiment was to start the sonic agitator to insure complete dispersal of spores. In experiments where sonic energy was to be absent, the bar was turned off after 30 seconds of mixing. The initial sample was collected and the data acquisition system program was initiated. The ozone generator was started, and the sampling valve was simultaneously bumped to signal the data acquisition system that the generator was energized. This time signal essentially defined the time, 0, of each experiment. A local timer was also started to guide the sampler in obtaining the time series sample. A purge was made of the delivery pipe by collecting a small volume of reactor fluid in a beaker and then the actual sample was delivered into the appropriate sterile bottle. The bottle was immediately shaken to distribute the quench fluid. Even though the sampler may have varied slightly from the exact schedule time of sampling, the real elapsed time could be derived from the logged data from operating the sample valve.

The laboratory was equipped with a Nuaire laminar flow hood, a Forma Scientific incubator, a Market Forge sterilizer, and a Bio-technologies colony counter. The procedure for counting viable spores was a direct adaptation of the SGM Biotech and standard plate count techniques procedure. Dilutions were made in standard EPA water and wastewater phosphate buffered sterile water. Dilutions of $10^1$, $10^2$, $10^3$ were made in triplicate for each sample. Accordingly, for a typical experiment where 6 samples were collected, 54 plates would be inoculated. The plates were pre-poured with tryptic soy agar, and a 1-mL aliquot of each dilution was pipetted onto a plate and evenly spread across the surface.

The plates were incubated at 3-35° C. before counting. Three additional control plates were inoculated with deionized filtered water. Counted colonies have a black dot in the center from the tallying pen. The colonies without the dot remain to be counted. Individual endospores in the population at the time of sampling are colony forming units (CFU).

The plate counts were periodically verified by filtering the samples onto a grid and staining with a fluorescent dye. All materials that had been contacted with spores, including vials, dilution bottles, pipette tips, and agar plates were autoclaved at 120° C. for 30 minutes prior to disposal.

Experimental Results:

The Effect of Acoustic Energy on Endospore Viability:

Acoustic energy was evaluated at two intensities for its ability to induce endospore damage in the absence of ozone. The transducer was operated at intensities 205 and 215 dB re 1 μPa in separate experiments of 60 minutes duration at 75

Figure 8:
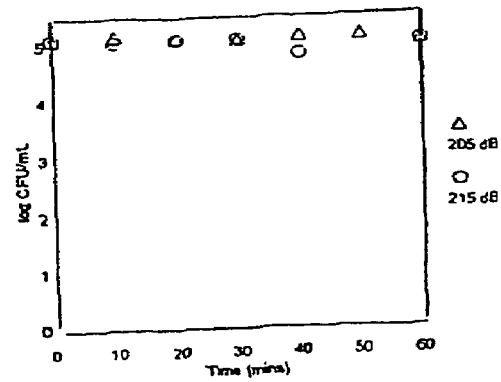
FIG. 8 is a plot of viable *B. subtilis* CFU in a sonicated reactor at two intensities.

Hz. Samples of the water were taken every 10 minutes over the hour. The results are plotted in FIG. 8 as the log of the number of colony forming units per mL present in the sample. Sonic energy alone does not appear to compromise the viability of the endospores, even after one-hour exposure. Prior work on higher organisms has shown that intensities of 190 dB of sound energy at similarly low frequency did no damage. One would expect that the damage would be mediated by cavitation phenomena, such as liquid jetting. The energy density (watts per volume) at low frequencies is not great enough to induce the amount of cavitational bubble collapse per unit volume required to produce a measurable decline in spore viability.

Figure 9:
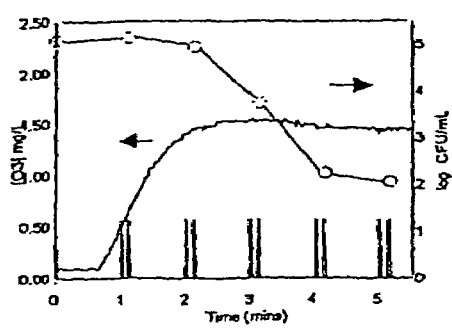
FIG. 9 is a chart showing the trace of a 1.5 mg/L experiment involving diffuser dispersal in deionized water.
Figure 10:
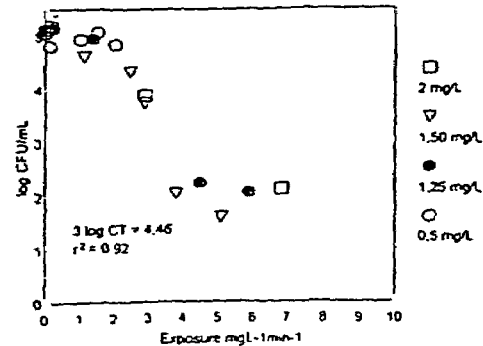
FIG. 10 charts the exposure curves for the diffuser.

The Effect of Ozone on Endospore Viability in the Absence of Acoustic Energy:

Ozone is typically delivered to a liquid in a bubble column or with a jet mixer. For the non-acoustic studies, a diffuser array was used which broke the ozone stream into a cloud of fine bubbles. These bubbles rose through the column of liquid, transferring ozone into the liquid. A series of experiments were conducted in which the ozone generator was fed back the dissolved ozone concentration, as registered by the probe. The concentration was maintained at a specific setpoint level. A typical data acquisition plot from these experiments is provided in FIG. 9. The ozone setpoint concentration was 1.5 mg/L, which it approximately reaches between 2 and 3 minutes. The plot that drops from left to right in the chart is the log of colony forming units per mL, which drops from about 5 (at 0 minutes) to about 2 (at 5 minutes). The vertical strikes at the bottom indicate when the sampling valve was actuated. The ozone (concentration-time) value for the reduction in viable endospores can be characterized in the following equation:

$$E = \int_0^1 c(t)\,dt, \quad (8)$$

where E is the exposure, t is the elapsed time to a sample, and c(t) is the time-dependent ozone concentration curve. The curves were integrated numerically after the captured data was imported into a spreadsheet. A simple trapezoidal algorithm was used to perform the integration. The results for the ozone-only experiments are shown in FIG. 10. The log 3 ozone concentration time value was obtained by regressing the log CFU vs. E for the steeply dipping portion of the curve. The value of E corresponding to a log 3 reduction (i.e., about log 2 CFU) was calculated. All data points follow the same exposure curve, regardless of the setpoint concentration. Regression of all data over the interval yield an ozone concentration time of 4.46. The data also indicate that a resistant fraction of the endospore population does not further respond on this time scale with just diffused ozone.

Figure 11:
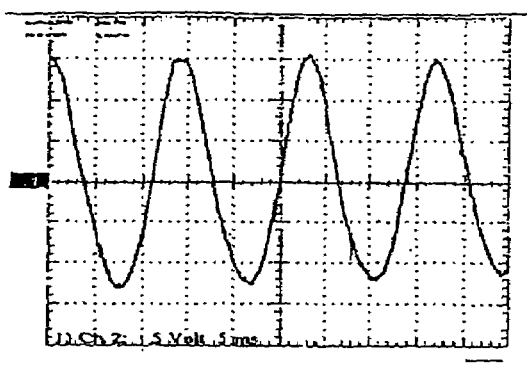
FIG. 11 charts a high-intensity acoustic signal in a matrix of water and ozone-containing gas bubbles.

The Effect of Acoustic Energy Combined with Ozone on Endospore Viability:

Adopting the same approach as above, acoustic energy at 205 and 215 dB re 1 µPa at 75 Hz was supplied along with the ozone over the same range of concentration. The acoustic pressure signal of the sonic devices was detected with a hydrophone sensor placed in the reactor. A typical 214 dB signal is shown in the captured trace in FIG. 11. In this series of experiments with a constant 1.5 mg/L concentration, the applied power of the ozone generator was constant; i.e., it was not controlled by the feedback of the dissolved ozone concentration controller. Higher intensity of applied acoustic energy appears to correlate to an increase in ozone mass transport. Utilizing the slopes of the ozone concentration curves, one can calculate an apparent mass transfer coefficient about 40% greater for the high acoustic intensity than for the low acoustic intensity, which was nominally the same as the sparger. This effect has been noted in other applications of ozone mixing, specifically in the oxidative treatment of waste streams. Intensity of this magnitude corresponds to pressure fluctuations of over 8 psi.

Figure 12:
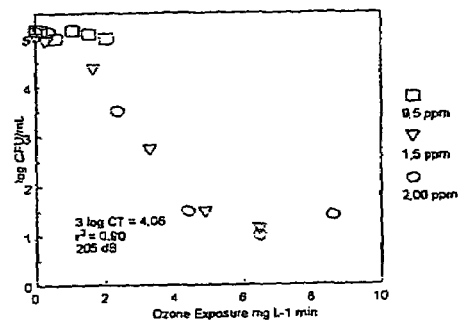
FIG. 12 plots exposure curves for 205 dB experiments in deionized water.
Figure 13:
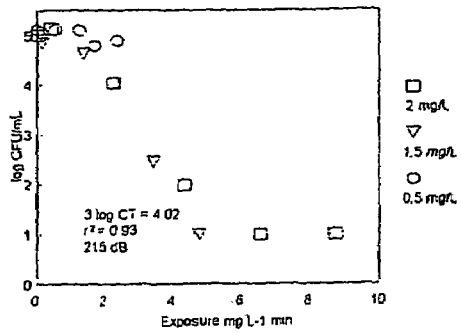
FIG. 13 plots exposure curves for 215 dB experiments in deionized water.

The bubble dynamics in the 215 dB environment were much more energetic than at 205 dB intensity. The corresponding pressure wave effects on mixing and mass transport should be evident. These acoustic pressure waves affect the bubbles by causing them to oscillate about an equilibrium or resonant diameter. The effect of the acoustic energy on ozone disinfection is seen in FIGS. 12 (at 205 dB) and 13 (at 215 dB). The log 3 ozone concentration time value decreased from 4.5 to 4.0, and the number of resistant spores surviving the contact was lower for the acoustically assisted ozonation as the intensity is increased to 215 dB. In the presence of small ozone demand, acoustic energy enhanced ozone disinfection. The levels of dissolved ozone indicated that an ozone concentration time value of about 4 was required to lower the population of viable $B.\ subtilis$ endospores by 99.9% in buffered water (pH 7.8) with no additional ozone demand than the spores themselves.

Moving to a matrix closer to actual ballast water, a synthetic seawater matrix was created according to a standard recipe. The composition of the constituent salts is given in Table 1.

TABLE 1

Composition of synthetic seawater:

| Component | Conc. (mg/L) |
|---|---|
| NaF | 3 |
| $SrCl_2.6H_2O$ | 20 |
| $H_3BO_3$ | 30 |
| KBr | 100 |
| KCl | 700 |
| $CaCl_2.2H_2O$ | 1470 |
| $Na_2SO_4$ | 4000 |
| $MgCl_2.6H_2O$ | 10780 |
| NaCl | 23500 |
| $Na_2SiO_3.9H_2O$ | 20 |
| $Na_4EDTA$ | 1 |
| $NaHCO_3$ | 200 |

Figure 14:
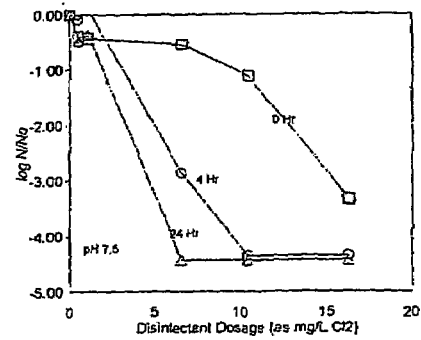
FIG. 14 charts the decrease in endospore viability in synthetic seawater at a pH of 7.5.
Figure 15:
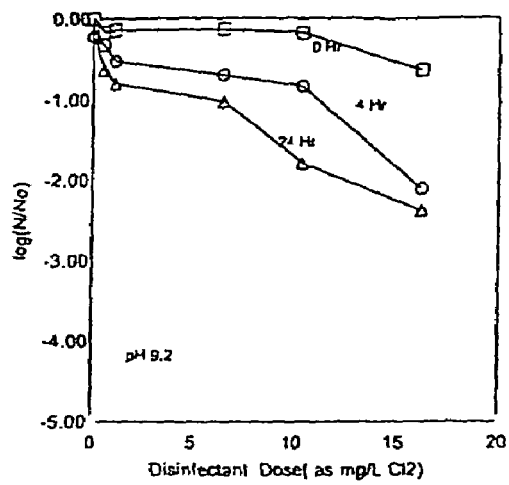
FIG. 15 charts the decrease in endospore viability under the same conditions, except at a pH of 9.2 in synthetic seawater.
Figure 16:
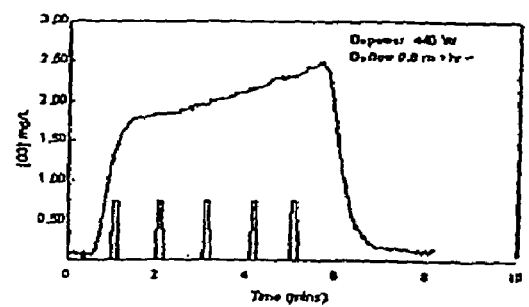
FIG. 16 charts the trace of dissolved ozone concentration during ozonation with 440 watts of power and 0.8 m$^3$ hr$^{-1}$ of ozone.
Figure 17:
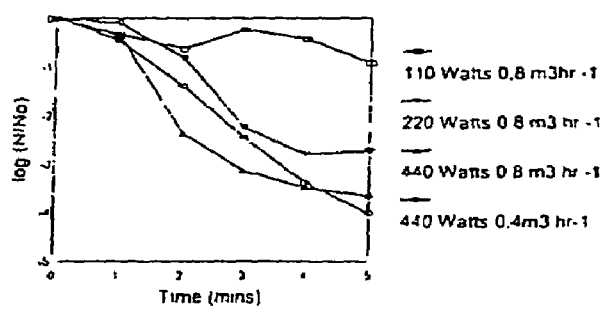
FIG. 17 charts the reduction in endospore viability with ozone power output in an actual ballast water challenge.

Challenges in this matrix were conducted via a procedure similar to the above-described deionized water experiments, with acoustic energy applied, as above, at 75 Hz. The initial ozone delivery rate was the same as that employed in the 1.5 mg/L setpoint experiment. At this output power (110 watts) at 0.8 $m^3\ hr^{-1}$, no measurable dissolved ozone concentration was obtained. The amount of disinfectant produced was measured in solution as total chlorine residual. Because ozone is short-lived, disinfectant dose is expressed as a chlorine residual, a gross indicator of oxidative disinfection power. The pH has a marked effect on disinfection. FIGS. 14 and 15 show the reduction in endospore viability as a function of initial disinfectant dose (as mg/L chlorine) for pH 7.5 (FIG. 14) and pH 9.2 (FIG. 15). At pH values above 8, a significant amount of ozone decays to the reactive hydroxyl radical specie. The residual disinfection power resulting from the reactions of ozone with bromide and other species, such as ammonia, is much greater, lasting for up to two days.

The ozone concentration time value for endospore deactivation is far smaller than for the bromine species resulting from ozone oxidation of bromide. For disinfection applications in waters of high demands, the contactor technology is capable of pumping ozone into the liquid at a rate sufficient to maintain a metastable steady state concentration of dissolved ozone above the required threshold for rapid deactivation of spores. The contactor has the following two characteristics that lend themselves to operation in this manner: 1) superior gas/liquid mass transport characteristics; and 2) vigorous bubble dynamics that improve contact of the bubbles with suspended life forms.

The shortened contact time at high dissolved-ozone concentration enables the holding and contact vessels to be sized in a reasonably small volume, but compatible with high throughputs of ballast water. This metastable ozone concentration need only be maintained for a minute or two to obtain the required killing and deactivation. The engineering details of such an approach would be part of the focus of this proposal. For example, the pumping of ozone into the liquid could be staged; i.e., the acoustic contactor could raise the concentration of ozone to a level above the threshold, after which the ballast water would be pumped to a holding tank where the ozone would decay under quiescent conditions. A second pulse of ozone could be delivered in a second acoustic contactor after the first ozone concentration decayed.

Challenge experiments were conducted using synthetic seawater at ozone-generator power settings of 440 watts and 660 watts and at gas flow rates of 0.4 and 0.8 $m^3hr^{-1}$. For each power setting, the mass of ozone produced per unit time is independent of the gas flow, to a first approximation. A higher gas flow means more bubbles with a lower ozone concentration but higher interfacial area, while a low gas flow means fewer bubbles with a higher concentration but less interfacial area. At higher power settings (e.g. at 660 watts), a greater amount of gas (i.e., more bubbles or greater interfacial surface area) appears to have a greater effect in promoting the disinfection process than does the production of a higher concentration of ozone in fewer bubbles. The enhanced mass transport of ozone into the liquid results in elevated concentrations of oxidation byproducts, which is reflected in residual chlorine measurements.

The basic approach was evaluated with batch challenging of actual ballast water. The water came from the hold of a ship originating from Port Moin, Costa Rica. Ballast water in the ship was sampled in the Port of Philadelphia, and the biota in the samples was characterized by the Bigelow Laboratory for Ocean Sciences. About 80% of the water was taken on or exchanged in the Caribbean, while it is believed that the remaining 20% came from the port of origin. The water had been in the ballast tanks for 21 days, and total ballast capacity of the vessel was 265 cubic meters. The samples were drawn at the 73 cubic meter level.

Results of the chemical analysis showed that the ballast water was not completely marine in character. The bromide concentration was 29.2 mg/L, less than half of the typical seawater concentration of 65 mg/L. The pH of the water was near 7.6, while the average ocean water has pH nearer 8.2. The chloride concentration in the ballast water was $1.27\times10^4$ mg/L. The results of the chemical characterization are shown in Table 2.

TABLE 2

Chemical composition of ballast water.

| Component | Conc. mg/L | Component | Conc. mg/L |
|---|---|---|---|
| $Ca^{2+}$ | 267 | $Cl^-$ | 12700 |
| $Mg^{2+}$ | 786 | $SO_4^{2-}$ | 1770 |
| $Sr^{2+}$ | 4.9 | $CaCO_3$ | 9.1 |
| $Fe^{2+}$ | 0.5 | $Br^-$ | 29.2 |

TABLE 2-continued

Chemical composition of ballast water.

| Component | Conc. mg/L | Component | Conc. mg/L |
|---|---|---|---|
| $Na^+$ | 6130 | $F^-$ | 0.66 |
| $K^+$ | 248 | | |
| $Mn^{2+}$ | <0.04 | pH | 7.6 |
| B | 1.3 | TOC | <6 |
| Si | <0.7 | COD | na |

The characterization of the life forms in each of the eight barrels is given in Table 3.

TABLE 3

Summary of biota composition of ballast water obtained for testing:

| Barrel | Ciliates | Dinoflagellates | Nematodes | Rotifer |
|---|---|---|---|---|
| 1 | present | present | present | present |
| 2 | present | present | | present |
| 3 | present | present | | |
| 4 | present | present | | |
| 5 | present | | | |
| 6 | | | | |
| 7 | present | present | | |
| 8 | present | present | | |

An initial challenge of the ballast water was made using Barrel #4 which contained a variety of organisms. *B. subtilis* endospores were added to assess the degree of disinfection occurring. Testing was conducted at ozone generator power settings from 110 to 440 watts with gas flows of 0.4 and 0.8 $m^3\ hr^{-1}$. A typical trace of ozone concentration (mg/L) as a function of time for a power of 440 watts and 0.8 $m^3\ hr^{-1}$ is shown in FIG. 16. As is seen in FIG. 17 (where the upper-most plot at 3, 4 and 5 minutes is for the 100 watt sample), the 440-watt power setting was most effective for disinfection. The 0.8 $m^3\ hr^{-1}$ flow was slightly faster in achieving a given level of spore deactivation. However, the level of dissolved ozone for either condition was not significantly different, but the chlorine equivalent concentration in the high gas flow was nearly double that of the low gas flow.

A challenge was made of unfortified ballast water (without *B. subtilis* endospores) to assess the killing of organisms contained in the ballast water. For this test, an applied ozone power of 660 watts was used with 0.8 $m^3hr^{-1}$. The samples were quenched by adding 10 ml of 1% sodium thiosulfate to the 1 L HDPE collection bottles prior to collecting the samples. A control sample without ozone treatment or quenchant was submitted along with a control containing the quenchant without treatment. Observations from Bigelow Laboratories indicate that the sodium thiosulfate did not adversely affect the organisms in the samples, as the controls were both similar to the original characterization samples submitted earlier.

The treatment times for the samples were in one-minute increments from one to five minutes. Analysis of the treated samples by Bigelow Laboratories (see tables, below) showed that the samples were nearly devoid of life. Even though all treated samples were positive for bacteria and zooflagellates, there were no ciliates, dinoflagellates, nematodes, etc., observed. Of the thirty culture media tests for the treated samples, only the one-minute treated sample showed positive growth of a green coccoid alga in the DYU medium. Accordingly, and as reported by Bigelow Laboratories, the treatment process drastically reduced the numbers and kinds of living organisms.

Phase II Testing at Higher Frequencies in a Flowing System:

Samples 1A-6A:

A summary of data from harbor water samples that were examined by Bigelow Laboratory is provided in Table 4, below. Bigelow Laboratory inoculated 200 μL of sample into various media the day after the samples were collected. The flow rate, water pressure (PSI), temperature, ultrasonic treatment system (UTS) and ozone treatment values were provided by ETI. The hydrogen ion concentration (pH) and salinity values were determined at Bigelow Laboratory. Culture treatments included tests for the presence of bacteria and fungi [peptonemethylamine broth (PM), peptone broth (P), test medium (TM), malt broth (M)] and tests for the presence of phytoplankton [DY-V medium, freshwater (DYV), K medium, oceanic (K), L1+NH$_4$, coastal (L1+NH$_4$), black sea medium, brackish at 16 psu (Blk Sea), L1/24 medium, coastal at 24 psu (L1/24), Prov medium, coastal enriched with soil extract (Prov)]. Bacterial growth (Bac) developed in all of the bacterial test media. Phytoplankton (PHY) grew in all algal growth media (see footnotes for details).

TABLE 4

| Sample | Location | Flow Rate | Temp (° F.) | UTS | Ozone | pH | Salinity | PM | P | TM | M | DYV | K | L1 + NH$_4$ | Blk Sea | L1/24 | Prov |
|---|---|---|---|---|---|---|---|---|---|---|---|---|---|---|---|---|---|
| 1A | Inlet | 125 gpm | 74 | Full[1] | Full[2] | 7.0 | 8 psu | Bac | Bac | Bac | Bac | PHY[3] | PHY[4] | PHY[5] | PHY[6] | PHY[7] | PHY[8] |
| 2A | Inlet | 125 gpm | 74 | Full[1] | Full[2] | 7.0 | 8 psu | Bac | Bac | Bac | Bac | PHY[3] | PHY[4] | PHY[5] | PHY[6] | PHY[7] | PHY[8] |
| 3A | Outlet | 125 gpm | 75 | Full[1] | Full[2] | 7.0 | 8 psu | Bac | Bac | Bac | Bac | PHY[3] | PHY[4] | PHY[5] | PHY[6] | PHY[7] | PHY[8] |
| 4A | Outlet | 125 gpm | 75 | Full[1] | Full[2] | 7.0 | 8 psu | Bac | Bac | Bac | Bac | PHY[3] | PHY[4] | PHY[5] | PHY[6] | PHY[7] | PHY[8] |
| 5A | Strainer | 125 gpm | 74 | Full[1] | Full[2] | 7.1 | 8 psu | Bac | Bac | Bac | Bac | PHY[3] | PHY[4] | PHY[5] | PHY[6] | PHY[7] | PHY[8] |
| 6A | Strainer | 125 gpm | 74 | Full[1] | Full[2] | 7.1 | 8 psu | Bac | Bac | Bac | Bac | PHY[3] | PHY[4] | PHY[5] | PHY[6] | PHY[7] | PHY[8] |

[1]In this table, and in each of the following tables, "Full" UTS is 20,000 watts at dual frequencies of 16 and 20 kHz.
[2]In this table, and in each of the following tables, "Full" ozone is a concentration of 1.0 mg/L in the ballast water.
[3]Various diatoms, especially *Thalassiosira*, zooflagellates (e.g., *Cafeteria*).
[4]Predominately diatoms (e.g., *Skeletonema, Chaetoceros, Thalassiosira*) and zooflagellates (e.g., *Cafeteria*).
[5]Predominately diatoms (e.g., *Cylindrotheca, Thalassiosira, Skeletonema Chaetoceros*).
[6]Predominately diatoms (e.g., *Cylindrotheca, Thalassiosira, Skeletonema Chaetoceros*) and zooflagellates (e.g., *Cafeteria*).
[7]Diatoms (e.g., *Thalassiosira, Skeletonema*), cryptophtes (probably *Rhodomonas* and/or *Proteomonas*) and zooflagellates.
[8]Predominately zooflagellates (e.g., *Cafeteria*), some *Thalassiosira, Chaetoceros*.

Samples 7A-15A:

Table 5, below, provides a summary of data from a second batch of harbor water samples that were likewise examined by Bigelow Laboratory the day after they were collected. 200 μL of sample was inoculated into various media. The flow rate, water pressure (PSI), temperature, ultrasonic treatment system (UTS) and ozone treatment values were provided by ETI. The hydrogen ion concentration (pH) and salinity values were determined at Bigelow Laboratory. Culture treatments included tests for the presence of bacteria and fungi [peptonemethylamine broth (PM), peptone broth (P), test medium (TM), malt broth (M)] and tests for the presence of phytoplankton [DY-V medium, freshwater (DYV), K medium, oceanic (K), L1+NH$_4$, coastal (L1+NH$_4$), black sea medium, brackish at 16 psu (Blk Sea), L1/24 medium, coastal at 24 psu (L1/24), Prov medium, coastal enriched with soil extract (Prov)]. Bacterial growth (Bac) developed in all of the bacterial test media. Phytoplankton (PHY) grew in all algal growth media (see footnotes for details).

TABLE 5

| Sample | Location | Flow Rate | Temp (° F.) | UTS | Ozone | pH | Salinity | PM | P | TM | M | DYV | K | L1 + NH4 | Blk Sea | L1/24 | Prov |
|---|---|---|---|---|---|---|---|---|---|---|---|---|---|---|---|---|---|
| 7A | Inlet | 30 gpm | 60 | Full | Off | 7.0 | 10 psu | Bac | Bac | Bac | Bac | PHY[1] | PHY[2] | PHY[3] | PHY[4] | PHY[5] | PHY[6] |
| 8A | Outlet | 30 gpm | 60 | Full | Off | 7.0 | 9.5 psu | Bac | Bac | Bac | Bac | PHY[1] | PHY[2] | PHY[3] | PHY[4] | PHY[4] | PHY[6] |
| 9A | Strainer | 30 gpm | 66 | Full | Off | 7.0 | 9.5 psu | Bac | Bac | Bac | Bac | PHY[1] | PHY[2] | PHY[3] | PHY[4] | PHY[4] | PHY[6] |
| 10A | Inlet | 10 gpm | 66 | Full | Off | 7.0 | 10 psu | Bac | Bac | Bac | Bac | PHY[1] | PHY[2] | PHY[3] | PHY[4] | PHY[4] | PHY[6] |
| 11A | Outlet | 10 gpm | 66 | Full | Off | 7.0 | 9.5 psu | Bac | Bac | Bac | Bac | PHY[1] | PHY[2] | PHY[3] | PHY[4] | PHY[4] | PHY[6] |
| 12A | Strainer | 10 gpm | 66 | Full | Off | 7.0 | 9.5 psu | Bac | Bac | Bac | Bac | PHY[1] | PHY[2] | PHY[3] | PHY[4] | PHY[4] | PHY[6] |
| 13A | Inlet | 50 gpm | 66 | Full | Off | 7.0 | 10 psu | Bac | Bac | Bac | Bac | PHY[1] | PHY[2] | PHY[3] | PHY[4] | PHY[4] | PHY[6] |
| 14A | Outlet | 50 gpm | 66 | Full | Off | 7.0 | 9.5 psu | Bac | Bac | Bac | Bac | PHY[1] | PHY[2] | PHY[3] | PHY[4] | PHY[4] | PHY[6] |
| 15A | Strainer | 50 gpm | 66 | Full | Off | 7.0 | 9.5 psu | Bac | Bac | Bac | Bac | PHY[1] | PHY[2] | PHY[3] | PHY[4] | PHY[4] | PHY[6] |

[1]Predominately zooflagellates (e.g., *Cafeteria* and *Paraphysomonas*).
[2]Predominately zooflagellates (e.g., *Cafeteria*), some *Thalassiosira, Skeletonema* and ciliates.
[3]Predominately zooflagellates (e.g., *Cafeteria*) some *Ochromonas* and ciliates.
[4]Predominately zooflagellates (e.g., *Cafeteria*) some *Coscinodiscus* and ciliates.
[5]Predominately zooflagellates (e.g., *Cafeteria*) some *Skeletonema*.
[6]Predominately zooflagellates (e.g., *Cafeteria*) some *Ochromonas* and *Skeletonema*.

Samples 16A-27A:

A summary of data is provided in Table 6, below, from a second batch of harbor water samples that were likewise examined by Bigelow Laboratory the day after they were collected. 200 μL of sample was inoculated into various media. The flow rate, water pressure (PS), temperature, ultrasonic treatment system (UTS) and ozone treatment values were provided by ETI. The hydrogen ion concentration (pH) and salinity values were determined at Bigelow Laboratory. Culture treatments included tests for the presence of bacteria and fungi [peptonemethylamine broth (PM), peptone broth (P), test medium (TM), malt broth (M)] and tests for the presence of phytoplankton [DY-V medium, freshwater (DYV), K medium, oceanic (K), L1+$NH_4$, coastal (L1+$NH_4$), black sea medium, brackish at 16 psu (Blk Sea), L1/24 medium, coastal at 24 psu (L1/24), Prov medium, coastal enriched with soil extract (Prov)]. Bacterial growth (Bac) developed in all of the bacterial test media. Zooflagellates (Zoo) grew in all algal growth media from inlet and strainer samples but none from the outlet samples.

TABLE 6

| Sample | Location | Flow Rate | Temp (° F.) | UTS | Ozone | pH | Salinity | PM | P | TM | M | DYV | K | L1 + $NH_4$ | Blk Sea | L1/24 | Prov |
|---|---|---|---|---|---|---|---|---|---|---|---|---|---|---|---|---|---|
| 16A | Inlet | 10 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |
| 17A | Outlet | 10 gpm | 65 | Full | 60.0% | 7.4 | 7 psu | Bac | Bac | Bac | Bac | — | — | — | — | — | — |
| 18A | Strainer | 10 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |
| 19A | Inlet | 30 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |
| 20A | Outlet | 30 gpm | 65 | Full | 60.0% | 7.4 | 7 psu | Bac | Bac | Bac | Bac | — | — | — | — | — | — |
| 21A | Strainer | 30 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |
| 22A | Inlet | 50 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |
| 23A | Outlet | 50 gpm | 65 | Full | 60.0% | 7.4 | 7 psu | Bac | Bac | Bac | Bac | — | — | — | — | — | — |
| 24A | Strainer | 50 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |
| 25A | Inlet | 88 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |
| 26A | Outlet | 88 gpm | 65 | Full | 60.0% | 7.2 | 7 psu | Bac | Bac | Bac | Bac | — | — | — | — | — | — |
| 27A | Strainer | 88 gpm | 65 | Full | 60.0% | 7.1 | 7 psu | Bac | Bac | Bac | Bac | Zoo[1] | Zoo[1] | Zoo[1] | Zoo[1] | Zoo[1] | Zoo[1] |

[1]Predominately zooflagellates (e.g., *Cafeteria*).

Samples 28A-38A:

In table 7, below, a summary of data is provided from a second batch of harbor water samples that were likewise examined by Bigelow Laboratory the day after they were collected. 200 μL of sample was inoculated into various media. The flow rate, water pressure (PS), temperature, ultrasonic treatment system (UTS) and ozone treatment values were provided by ETI. The hydrogen ion concentration (pH) and salinity values were determined at Bigelow Laboratory. Culture treatments included tests for the presence of bacteria and fungi [peptonemethylamine broth (PM), peptone broth (P), test medium (TM), malt broth (M)] and tests for the presence of phytoplankton [DY-V medium, freshwater (DYV), K medium, oceanic (K), L1+$NH_4$, coastal (L1+$NH_4$), black sea medium, brackish at 16 psu (Blk Sea), L1/24 medium, coastal at 24 psu (L1/24), Prov medium, coastal enriched with soil extract (Prov)]. Bacterial growth (Bac) developed in all test media without ozone treatment or growth (Bac) developed in all test media without ozone treatment or with a flow rate over 30 gpm.

TABLE 7

| Sample | Location | Flow Rate | Temp (° F.) | UTS | Ozone | pH | Salinity | PM | BP | TM | M | DYV | K | L1 + $NH_4$ | Blk Sea | L1/24 | Prov |
|---|---|---|---|---|---|---|---|---|---|---|---|---|---|---|---|---|---|
| 28A | Inlet | 30 gpm | 63 | — | — | 7.1 | 9 psu | Bac | Bac | Bac | Bac | — | — | — | — | — | — |
| 29A[1] | Outlet | 10 gpm | 63 | Full | Full | 7.1 | 9 psu | — | — | — | — | — | — | — | — | — | — |
| 30A | Outlet | 10 gpm | 63 | Off | Full | 7.1 | 9 psu | — | — | — | — | — | — | — | — | — | — |
| 31A | Outlet | 10 gpm | 63 | Full | Off | 7.1 | 9 psu | Bac | — | Bac | Bac | — | — | — | — | — | — |
| 32A[1] | Outlet | 30 gpm | 63 | Full | Full | 7.1 | 9 psu | — | — | — | — | — | — | — | — | — | — |
| 33A | Outlet | 30 gpm | 63 | Off | Full | 7.1 | 9 psu | — | — | — | — | — | — | — | — | — | — |
| 34A | Outlet | 30 gpm | 63 | Full | Off | 7.1 | 9 psu | Bac | Bac | Bac | Bac | — | — | — | — | — | — |
| 35A[1] | Outlet | 50 gpm | 63 | Full | Full | 7.1 | 9 psu | Bac[2] | — | Bac[3] | Bac[3] | — | — | — | — | — | — |
| 36A | Outlet | 50 gpm | 63 | Off | Full | 7.1 | 9 psu | — | Bac | Bac | Bac | — | — | — | — | — | — |
| 37A | Outlet | 50 gpm | 63 | Full | Off | 7.1 | 9 psu | Bac | Bac | Bac | Bac | — | — | — | — | — | — |
| 38A[1] | Outlet | 100 gpm | 63 | Full | Full | 7.1 | 9 psu | Bac | Bac | Bac | Bac | — | — | — | — | — | — |

[1]Triplicate cultures for bacterial and algal growth; results (presence, absence) were identical in all three replicates unless otherwise indicated.
[2]One of the triplicate cultures had bacteria, the other two tested negative for the presence of bacteria.
[3]One of the triplicate cultures had bacteria, the other two tested negative for the presence of bacteria.

In table 8, below, a summary of data is provided from a second batch of harbor water samples that were likewise examined by Bigelow Laboratory the day after they were collected. 200 μL of sample was inoculated into various media. The flow rate, water pressure (PSI), temperature, ultrasonic treatment system (UTS) and ozone treatment values were provided by ETI. The hydrogen ion concentration (pH) and salinity values were determined at Bigelow Laboratory. Culture treatments included tests for the presence of bacteria and fungi [peptonemethylamine broth (PM), peptone broth (P), test medium (TM), malt broth (M)] and tests for the presence of phytoplankton [DY-V medium, freshwater (DYV), K medium, oceanic (K), L1+NH$_4$, coastal (L1+NH$_4$), black sea medium, brackish at 16 psu (Blk Sea), L1/24 medium, coastal at 24 psu (L1/24), Prov medium, coastal enriched with soil extract (Prov)]. Bacterial growth (Bac) developed in all of the bacterial test media without ozone treatment.

TABLE 8

| Sample | Location | Flow Rate | Temp (° F.) | UTS | Ozone | pH | Salinity | PM | P | TM | M | DYV | K | L1 + NH$_4$ | Blk Sea | L1/24 | Prov |
|---|---|---|---|---|---|---|---|---|---|---|---|---|---|---|---|---|---|
| 40A | Inlet | 30 gpm | 60 | — | — | 7.7 | 37 psu | Bac | Bac | Bac | Bac | — | — | — | — | — | — |
| 41A[1] | Outlet | 30 gpm | 60 | Full | Full | 7.9 | 37 psu | — | — | — | — | — | — | — | — | — | — |
| 42A | Outlet | 30 gpm | 60 | Full | Off | 7.7 | 37 psu | Bac | — | Bac | Bac | — | — | — | — | — | — |
| 43A[1] | Outlet | 30 gpm | 60 | Off | Full | 7.8 | 37 psu | — | — | — | — | — | — | — | — | — | — |
| 44A[1] | Outlet | 10 gpm | 60 | Full | Full | 7.9 | 37 psu | — | — | — | — | — | — | — | — | — | — |
| 45A | Outlet | 10 gpm | 60 | Full | Off | 7.7 | 37 psu | Bac | — | Bac | Bac | — | — | — | — | — | — |
| 46A | Outlet | 10 gpm | 60 | Off | Full | 7.8 | 37 psu | — | — | — | — | — | — | — | — | — | — |

[1]Triplicate cultures for bacterial and algal growth; results (presence, absence) were identical in all three replicates.

The above tables show that outlet samples, after receiving full ozone treatment at flow rates of 30 gpm or less, contained no living microorganisms that were present in the ballast inlet samples. Accordingly, these treatments killed all bacteria, as evidenced by no bacterial growth in the samples after a 21-day incubation.

The following tables report data generated at the University of Maryland-Baltimore County, measuring the amount of bromide and bromate in water including dissolved ozone. "Bay water" samples were taken from the inner harbor in Baltimore, Md. The "ballast water" samples were taken from deep sea on board the ship, Cape Wrath, at latitude 30° 21.8'N and longitude 34° 03.8'W. The results show that bromides and bromates are not generated in substantial amounts in water treated at the flow rates that were shown, above, to offer effective kill rates in the ballast water samples. The natural amount of bromide found in coastal waters is 65 mg/L, and the treated samples did not vary substantially from this norm.

TABLE 9

| Sample ID | Outlet/Inlet | Flow Rate (GPM | pH @ 24° C. | Conductivity @ 24° C. (mS) | Ozone | Conc. of Bromide (ppm) | % RSD | Conc. of Bromate (ppm) | % RSD |
|---|---|---|---|---|---|---|---|---|---|
| Bay Water | Inlet | 10-20-50-88 | 7.54 | 10.45 | absent | 24.93 | 3.05 | 0.0049 | 0.34 |
| Bay Water (2) | Outlet | 10 | 7.29 | 10.55 | absent | 21.98 | 3.71 | 0.172 | 3.15 |
| Bay Water (4) | Outlet | 30 | 7.43 | 10.60 | absent | 23.82 | 1.11 | 0.120 | 2.49 |
| Bay Water (6) | Outlet | 50 | 7.38 | 10.58 | absent | 25.23 | 1.07 | 0.113 | 6.03 |
| Bay Water (8) | Outlet | 88 | 7.50 | 11.00 | absent | 24.10 | 1.72 | ND | — |

TABLE 10

| Sample ID | Outlet/Inlet | Flow Rate (GPM | pH @ 24° C. | Conductivity @ 24° C. (mS) | Ozone | Conc. of Bromide (ppm) | % RSD | Conc. of Bromate (ppm) | % RSD |
|---|---|---|---|---|---|---|---|---|---|
| Bay Water (12) | Inlet | 10-30-50-100 | 7.25 | 15.11 | absent | 30.32 | 1.97 | ND | — |
| Bay Water (9) | Outlet | 10 | 6.81 | 15.00 | present* | 27.11 | 7.83 | 0.223 | 6.47 |

TABLE 10-continued

| Sample ID | Outlet/Inlet | Flow Rate (GPM | pH@ 24° C. | Conductivity @ 24° C. (mS) | Ozone | Conc. of Bromide (ppm) | % RSD | Conc. of Bromate (ppm) | % RSD |
|---|---|---|---|---|---|---|---|---|---|
| Bay Water (10) | Outlet | 30 | 7.17 | 15.39 | absent | 28.20 | 2.60 | 0.091 | 0.29 |
| Bay Water (11) | Outlet | 50 | 7.19 | 14.95 | absent | 30.02 | 3.33 | 0.090 | 0.07 |
| Bay Water (13) | Outlet | 100 | 7.23 | 15.01 | absent | 31.70 | 2.25 | ND | — |

TABLE 11

| Sample ID | Outlet/Inlet | Flow Rate (GPM | pH@ 24° C. | Conductivity @ 24° C. (mS) | Ozone | Conc. of Bromide (ppm) | % RSD | Conc. of Bromate (ppm) | % RSD |
|---|---|---|---|---|---|---|---|---|---|
| Ballast Water (15) | Inlet | 10-30 | 7.89 | 36.6 | absent | 77.86 | 0.52 | ND | — |
| Ballast Water (17) | Outlet | 10 | 8.20 | 40.80 | present* | 73.65 | 0.90 | 0.400 | 1.18 |
| Ballast Water (16) | Outlet | 30 | 8.11 | 35.20 | present* | 75.95 | 0.60 | ND | — |

Ozone was present in the range of 0.01 to 0.1 mg/L in the ballast water samples collected from the outlet and also in one of the bay water samples collected from the outlet with a very low flow rate.

CONCLUSIONS

The challenge experiments (based on deactivation of *B. subtilis* endospores) indicate that treatment of ballast water in the sonic contacting device is possible, even in marine brines. Although the sonic device does not appear to produce sufficient energy density to damage smaller particles such as spores or cysts directly, the gas-liquid mass transport aspects of acoustic fields and small scale micromixing function to make the technology ideal for agitating a contact vessel for ozone treatment of the ballast water.

The ozone should be delivered fast enough that a transient steady state ozone concentration can be maintained between 0.5 and 1 mg/L for several minutes time. The dosing of ozone required to achieve this condition will be strongly a function of the ballast water type, the greatest demand coming from completely marine waters, as one might suspect. There will be an optimum ozone gas concentration and volumetric flow regime that will minimize the amount of oxidation byproduct formation, but provide reasonable disinfection. Where this optimum occurs in terms of operational parameters will depend on the configuration of the flow through contact unit and nature of the bubble dynamics inside the contractor.

For disinfection to occur rapidly, the creatures must experience an ozone concentration, either in the bulk liquid or in the film around the gas bubble. The ozone must be transferred from the bubble at a rate fast enough to keep pace with the many demand reactions, yet still provide a small steady state ozone concentration. If too much aqueous ozone is present at steady state, the rate of some parasitic reactions may be accelerated. If too little is supplied by the bubble, a concentration of ozone can't be maintained for disinfection. Contact with the bubbles is important for disinfection also.

The ResonantSonic™ device can supply ozone quickly enough, enhancing ozone transfer through the acoustic bubble pumping and boundary layer disruption. Bubble contact is promoted through micromixing. Simply promoting mass transfer of ozone into the liquid alone will not suffice to optimize the process. The number of bubbles and their ozone concentration and the configuration of the bubble introduction into the acoustic field can all be balanced in an effort to achieve optimal disinfection.

The indications are that the sonic ozone contactor provides means to shorten the contact time for disinfection by creating a metastable dissolved-ozone concentration in ballast water through increased gas-liquid mass transport during contacting. Thus, dissolved ozone serves as a process-monitoring variable during the disinfection process.

Fluid dynamic modeling can be employed to optimize chamber design for gas bubble interaction with the acoustic field during the fluid residence time in the reactor. Consideration is also made for recycling of ozone-containing gas streams.

Ozone concentration time required by the process is established by the amount of "kill" required for disinfection of the ballast water, which is determined by a multiple log 10 reduction of the target species, typically by a log 10 of three or four. The experimental work indicated that the ozone concentration time was a function of the ozone concentration level, the sonication process and exposure of the contaminated ballast water laden with ozone after the sonic radiation had been terminated.

During the experimental work, it was observed that the parasitic ozone demand rate was different with and without sonic radiation, as was the effectiveness of ozone for disinfection. Disinfection is carried out most efficiently by using the least amount of ozone and reducing the amount of processing equipment volume, while sustaining sufficient ballast water flow to make the overall process practical for use as a ballast water disinfection method. Intensified contacting of the ballast water with sonic energy and high-concentration ozone for a brief period followed by transfer to a quiescent vessel for a contact period can be followed by a second energetic ozone pulse.

Ozonation of waters containing bromide result in the formation of bromate. Sea water typically contains 65 ppm bromide, which can be converted to several tens of ppm bromate.

US drinking water, treatment standards will probably require that the bromate level be maintained below 1 ppb.

Optimization tests can still utilize *B. subtilis* as an indicator specie for contacting efficiency, with the same analytical procedure as previously used. As more data become available, the *B. subtilis* ozone concentration time can be related to the necessary exposure for more difficult forms of nuisance species.

Additional details relating to the apparatus and methods described herein are provided in U.S. Ser. No. 60/488,358 (filed Jul. 18, 2003) and U.S. Ser. No. 60/536,428 (filed Jan. 14, 2004), both of which are incorporated herein by reference in their entirety.

In describing embodiments of the invention, specific terminology is used for the sake of clarity. However, the invention is not limited to the specific terms so selected, and each specific term at least includes all technical and functional equivalents that operate in a similar manner to accomplish a similar purpose. In addition, it should be understood that in some instances where a particular embodiment of the invention includes a plurality of system elements or method steps, those elements or steps may be replaced with a single element or step and vice versa. Likewise, while this invention has been shown and described with references to particular embodiments thereof, those skilled in the art will understand that various changes in form and details may be made therein without departing from the scope of the invention.

What is claimed is:

1. A method for treating ballast water emitted from a ballast tank of a water-borne ship, the method comprising:
    allowing water to flow out of the ballast tank;
    passing the water through a cylindrical tank after it flows out of the ballast tank, the passing comprising causing the water to enter the cylindrical tank through a water inlet and exit the cylindrical tank through a water outlet that are disposed proximate to two opposite ends of the cylindrical tank;
    injecting ozone into the water in the cylindrical tank via an ozone inlet disposed proximate to the water inlet;
    supplying acoustic energy into the water as the water passes from the water inlet to the water outlet, the acoustic energy being supplied by an acoustic mixing machine that comprises a mechanical member and an oscillator whose rotational frequency is adjusted to bring the mechanical member into resonance, the mechanical member comprising one or more of a hollow tube resonator and a solid bar that is positioned within the cylindrical tank approximately along a central axis of the cylindrical tank such that a first end of the mechanical member is proximate to the water inlet and a second end of the mechanical member is proximate to the water outlet, the mechanical member generating acoustic energy that is communicated to the ballast water contained in the cylindrical tank thereby causing the ballast water in the cylindrical tank to move through the tank from the water inlet to the water outlet with a circulating bulk flow pattern;
    breaking up the circulating bulk flow pattern to dissipate additional energy into the water, the breaking up occurring as the water encounters one or more acoustic focusing projections positioned within the cylindrical tank and into the circulating bulk flow pattern to thereby to dissipate additional energy into the water; and
    releasing the ballast water from the ship after the water exits the contactor.

2. The method of claim 1, wherein the acoustic energy is applied at dual frequencies.

3. The method of claim 2, wherein the dual frequencies are both in the range of about 16 kHz to 20 kHz.

4. The method of claim 3, wherein the dual frequencies are about 16 kHz and about 20 kHz.

5. The method of claim 1, wherein the acoustic energy is delivered at a power of at least 20,000 watts.

6. The method of claim 1, wherein the contactor apparatus is mounted on board the ship.

7. The method of claim 1, wherein organisms and other matter having dimensions larger than about 100 μm are removed from the ballast water before the ballast water passes through the contactor.

8. The method of claim 1, wherein the injected ozone and acoustic energy do not enter the ballast tanks.

9. The method of claim 1, wherein ozone is injected into the ballast water to form a concentration of ozone in the ballast water between about 0.5 and about 1.0 mg/L.

10. The method of claim 1, further comprising exposing the water to a quiescent period and then passing the water through the contactor apparatus again or through a second contactor apparatus.

11. The method of claim 1, further comprising measuring bromide and bromate concentrations and controlling the injecting of ozone into the contactor based on the measured bromide and bromate concentrations.

12. The method of claim 1, further comprising passing the water to a process-by-product neutralization tank before releasing the ballast water from the ship and adding one or more reagents to destroy bromide and/or bromate compounds in the process-by-product neutralization tank.

13. A contactor apparatus for disinfecting ballast water, the contactor apparatus comprising:
    a cylindrical tank through which the ballast water can flow and which comprises a water inlet and a water outlet that are disposed proximate to two opposite ends of the cylindrical tank and an ozone inlet disposed proximate to the water inlet;
    an acoustic mixing machine that comprises a mechanical member and an oscillator whose rotational frequency is adjusted to bring the mechanical member into resonance, the mechanical member comprising one or more of a hollow tube resonator and a solid bar that is positioned within the cylindrical tank approximately along a central axis of the cylindrical tank such that a first end of the mechanical member is proximate to the water inlet and a second end of the mechanical member is proximate to the water outlet, the mechanical member generating acoustic energy that is communicated to the ballast water contained in the cylindrical tank, thereby causing the ballast water in the cylindrical tank to move through the tank from the water inlet to the water outlet with a circulating bulk flow pattern;
    one or more acoustic focusing projections positioned within the cylindrical tank and into the circulating bulk flow pattern to thereby dissipate additional energy into the water; and
    an ozone source coupled with the contactor for supplying ozone into the cylindrical tank via the ozone inlet.

14. The contactor apparatus of claim 13, further comprising wherein plurality of resonating members within the cylindrical tank.

15. The contactor apparatus of claim 13, further comprising a quiescent container into which the water is passed after the and then passing the water through the contactor apparatus again or through a second contactor apparatus.

16. The contactor apparatus of claim 13, further comprising:

a system for measuring bromide and bromate concentrations in the water, the system providing a feedback signal; and a processor that controls the source of ozone to control a rate at which ozone is supplied to the water contained in the tank, the processor controlling the rate based on the measured bromide and bromate concentrations.

17. The contactor apparatus of claim 13, wherein the resonating member generates acoustic energy at frequencies in the range of about 16 kHz to about 20 kHz.

18. A ship suitable for sailing the seas, the ship comprising:
one or more ballast tanks;
one or more outlet passages coupled with ballast tank(s) for discharging ballast water from the ballast tanks, the outlet passage(s) having a discharge port for discharging ballast water from the ship;
one or more inlet passages coupled with ballast tank(s) for supplying water to the ballast tanks, the inlet passage(s) having an intake port for intake of ballast water from outside the ship; and
a contactor apparatus coupled with the outlet passage, enabling ballast water to flow out of the ballast tank(s) through the outlet passage(s) and through the contactor apparatus before leaving the ship, the contactor apparatus comprising one or more sonic generators for generating acoustic energy and a source of ozone, the contactor apparatus further comprising:
a cylindrical tank through which the ballast water can flow and which comprises a water inlet and a water outlet that are disposed proximate to two opposite ends of the cylindrical tank and an ozone inlet disposed proximate to the water inlet, the ozone inlet supplying ozone from the source of ozone to the ballast water in the cylindrical tank;
an acoustic mixing machine that comprises a mechanical member and an oscillator whose rotational frequency is adjusted to bring the mechanical member into resonance, the mechanical member comprising one or more of a hollow tube resonator and a solid bar that is positioned within the cylindrical tank approximately along a central axis of the cylindrical tank such that a first end of the mechanical member is proximate to the water inlet and a second end of the mechanical member is proximate to the water outlet the mechanical member generating acoustic energy that is communicated to the ballast water contained in the cylindrical tank, thereby causing the ballast water in the cylindrical tank to move through the tank from the water inlet to the water outlet with a circulating bulk flow pattern; and
one or more acoustic focusing projections positioned within the cylindrical tank and into the circulating bulk flow pattern to thereby to dissipate additional energy into the water.

19. The ship of claim 18, wherein the inlet port is positioned below the discharge port such that the inlet port can be submerged in a body of water while the discharge port is above the body of water when the ship is in the body of water.

20. The ship of claim 18, wherein the contactor comprises a plurality of mechanical members.

* * * * *